(12) United States Patent
Hatanaka et al.

(10) Patent No.: US 10,146,328 B2
(45) Date of Patent: *Dec. 4, 2018

(54) INPUT DEVICE INCLUDING A RESTRICTED FROM VARYING ELECTROMAGNETIC FORCE

(71) Applicant: DENSO CORPORATION, Kariya, Aichi-pref. (JP)

(72) Inventors: Shinji Hatanaka, Kariya (JP); Motoki Tachiiri, Nishio (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/531,745

(22) PCT Filed: Feb. 8, 2016

(86) PCT No.: PCT/JP2016/000633
§ 371 (c)(1),
(2) Date: May 31, 2017

(87) PCT Pub. No.: WO2016/139891
PCT Pub. Date: Sep. 9, 2016

(65) Prior Publication Data
US 2017/0269711 A1    Sep. 21, 2017

(30) Foreign Application Priority Data
Mar. 3, 2015  (JP) .................... 2015-041632

(51) Int. Cl.
*G06F 3/0338* (2013.01)
*H01H 36/02* (2006.01)
*H02K 41/035* (2006.01)

(52) U.S. Cl.
CPC .......... *G06F 3/0338* (2013.01); *H01H 36/02* (2013.01); *H02K 41/0354* (2013.01); *H01H 2231/026* (2013.01)

(58) Field of Classification Search
CPC ......... G06F 3/016; G06F 3/0354; G06F 3/038
See application file for complete search history.

(56) References Cited

U.S. PATENT DOCUMENTS 9,646,787 B2 * 5/2017 Hatanaka ............... H01H 36/02
2004/0059245 A1 3/2004 Watanabe et al.
(Continued)

FOREIGN PATENT DOCUMENTS

JP    2004112979 A    4/2004
JP    2011232946 A    11/2011
(Continued)

*Primary Examiner* — Chun-Nan Lin
(74) *Attorney, Agent, or Firm* — Harness, Dickey & Pierce, P.L.C.

(57) ABSTRACT

An input device includes: an input unit; a supporting unit supporting the input unit; a first actuator; a second actuator; and a magnetic path forming body forming a magnetic circuit that guides a magnetic flux generated by a first magnetic pole forming unit to pass through a second coil and that also guides a magnetic flux generated by a second magnetic pole forming unit to pass through a first coil. A magnetic resistance to be a resistance in the magnetic circuit is disposed at a middle location along a first connection part that connects an end of a first coil side part to an end of a second coil side part, and a second connection part that connects the other end of the first coil side part to the other end of the second coil side part.

3 Claims, 7 Drawing Sheets

(56) References Cited

U.S. PATENT DOCUMENTS

| | | | |
|---|---|---|---|
| 2016/0077590 A1* | 3/2016 | Tachiiri | G06F 3/0354 345/184 |
| 2016/0195937 A1* | 7/2016 | Tachiiri | G06F 3/0338 345/157 |
| 2016/0328018 A1* | 11/2016 | Hisatsugu | G06F 3/016 |
| 2017/0032915 A1* | 2/2017 | Hatanaka | G06F 3/016 |
| 2018/0004315 A1 | 1/2018 | Hatanaka et al. | |

FOREIGN PATENT DOCUMENTS

| | | |
|---|---|---|
| JP | 2014217176 A | 11/2014 |
| JP | 2015011383 A | 1/2015 |
| JP | 2015125552 A | 7/2015 |

\* cited by examiner

INPUT DEVICE INCLUDING A RESTRICTED FROM VARYING ELECTROMAGNETIC FORCE

CROSS REFERENCE TO RELATED APPLICATIONS

This application is a U.S. National Phase Application under 35 U.S.C. 371 of International Application No. PCT/JP2016/000633 filed on Feb. 8, 2016 and published in Japanese as WO 2016/139891 A1 on Sep. 9, 2016. This application is based on and claims the benefit of priority from Japanese Patent Application No. 2015-41632 filed on Mar. 3, 2015. The entire disclosures of all of the above applications are incorporated herein by reference.

TECHNICAL FIELD

The present disclosure relates to an input device.

BACKGROUND ART

Patent Literature 1 describes an input device including an operation knob to which an operational force is input and a main part supporting the operation knob to be movable by the input of the operational force. The input device further includes two voice coil motors. Each of the two voice coil motors has a magnet forming a magnetic pole and a voice coil which allows a magnetic flux generated by the magnet to pass, and functions as an actuator. In the two voice coil motors, each electromagnetic force generated by applying a current to each voice coil acts on the operation knob as an operation reaction force in directions perpendicular to each other. Accordingly, the input device makes a user to feel an operation reaction force with a certain strength through the operation knob by controlling the current applied to each voice coil.

PRIOR ART LITERATURES

Patent Literature

Patent Literature 1: JP 2011-232946 A

SUMMARY OF INVENTION

In Patent Literature 1, a yoke that forms a magnetic circuit is individually provided in each voice coil motor. Therefore, a magnetic flux generated from the magnet of one voice coil motor passes through only the voice coil in this motor, and does not pass through the voice coil in the other voice coil motor. Accordingly, for improving the density of the magnetic flux passing through each voice coil, it is necessary to strengthen the individual magnet provided in each voice coil motor. In this case, the amount of material forming the magnet has to increase.

Then, the inventors of the present application study a magnetic path forming object to form a magnetic circuit in the prior application (Japanese Patent Application No. 2013-268746) disclosed as JP 2015-125552 A, in which first ends of yokes of voice coils are connected with each other by a connection part. Further, magnetic flux generated in one voice coil is introduced to the other voice coil, and magnetic flux generated in the other voice coil is introduced to the one voice coil However, second ends of the yokes are not connected to each other in the magnetic path forming object. When the magnetic path forming object is viewed as a whole, a region where the density of magnetic flux is not uniform is generated. If the region where the density of magnetic flux is not uniform overlaps with an arrangement region of the magnet, an electromagnetic force generated in the voice coil motor is varied.

It is an object of the present disclosure to provide an input device in which the generated electromagnetic force is restricted from varying by reducing the influence caused by the region where the density of magnetic flux is not uniform.

According to an aspect of the present disclosure, an input device includes:

an input unit for input of an operating force in a direction along an imaginary operation plane;

a supporting unit supporting the input unit such that the input unit is movable along the operation plane in response to the input of the operating force;

a first actuator including a first magnetic pole forming unit and a first coil, the first magnetic pole forming unit forming a magnetic pole and generating a magnetic flux passing through the first coil such that an electromagnetic force generated by applying current to the first coil acts on the input unit as an operation reaction force in a first direction along the operation plane;

a second actuator including a second magnetic pole forming unit and a second coil, the second magnetic pole forming unit forming a magnetic pole and generating a magnetic flux passing through the second coil such that an electromagnetic force generated by applying current to the second coil acts on the input unit as an operation reaction force in a second direction along the operation plane and the second direction is nonparallel to the first direction; and a magnetic path forming body forming a magnetic circuit that guides the magnetic flux generated by the first magnetic pole forming unit so that the magnetic flux generated by the first magnetic pole forming unit passes through the second coil and that also guides the magnetic flux generated by the second magnetic pole forming unit so that the magnetic flux generated by the second magnetic pole forming unit passes through the first coil.

The magnetic path forming body includes a first coil side part corresponding to the first coil, a second coil side part corresponding to the second coil, a first connection part that connects an end of the first coil side part to an end of the second coil side part, and a second connection part that connects the other end of the first coil side part to the other end of the second coil side part.

A magnetic resistance to be a resistance in the magnetic circuit is disposed at a middle location along the first connection part and the second connection part.

Accordingly, the magnetic flux generated by the first magnetic pole forming unit in the first actuator passes through not only the first coil of the first actuator, but the second coil of the second actuator, by being introduced by the magnetic circuit formed with the magnetic path forming body. Similarly, the magnetic flux generated by the second magnetic pole forming unit in the second actuator passes through not only the second coil of the second actuator, but the first coil of the first actuator, by being introduced by the magnetic circuit. At this time, the generated magnetic flux will pass along the first connection part and the second connection part in the magnetic path forming body.

Thus, due to the configuration in which the magnetic flux generated by the magnetic pole forming unit of one actuator is led to the coil of the other actuator through a magnetic circuit, the density of magnetic flux passing through each coil can improve both in the two actuators. Therefore, the electromagnetic force able to be generated in each actuator can increase. Thus, the operation reaction force to be applied on the input unit can be increased, while the material amount used for forming each magnetic pole forming unit can be reduced.

Since magnetic resistance is disposed in the middle location along the first connection part and the second connection part, the area where the leakage magnetic flux is generated in the magnetic circuit can be intentionally moved to the neighborhood area of the magnetic resistance. Because the area where the leakage magnetic flux is generated can be located at the position distant from the first magnetic pole forming unit and the second magnetic pole forming unit, the influence by the leakage magnetic flux is reduced, such that the density of magnetic flux in the first magnetic pole forming unit and the second magnetic pole forming unit can be restricted from becoming not uniform. Therefore, the electromagnetic force generated in each actuator can be restricted from being varied.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Embodiments of the present disclosure will be described in the following with reference to drawings. In the following, components corresponding between embodiments may be denoted by identical reference numerals, and duplicate description of such components may be omitted. In cases where only a part of the configuration of an embodiment is described, the remaining part of the configuration of the embodiment may have a corresponding part of an earlier-described embodiment applied thereto. Also, besides combinations of configurations explicitly disclosed concerning individual embodiments, partial combinations of a plurality of embodiment configurations not explicitly disclosed are also allowed provided that such combinations do not cause any combinational problem. Furthermore, combinations, not explicitly disclosed, of configurations described concerning embodiments and modifications are also regarded as disclosed by the following description.

(First Embodiment)

Figure 1:
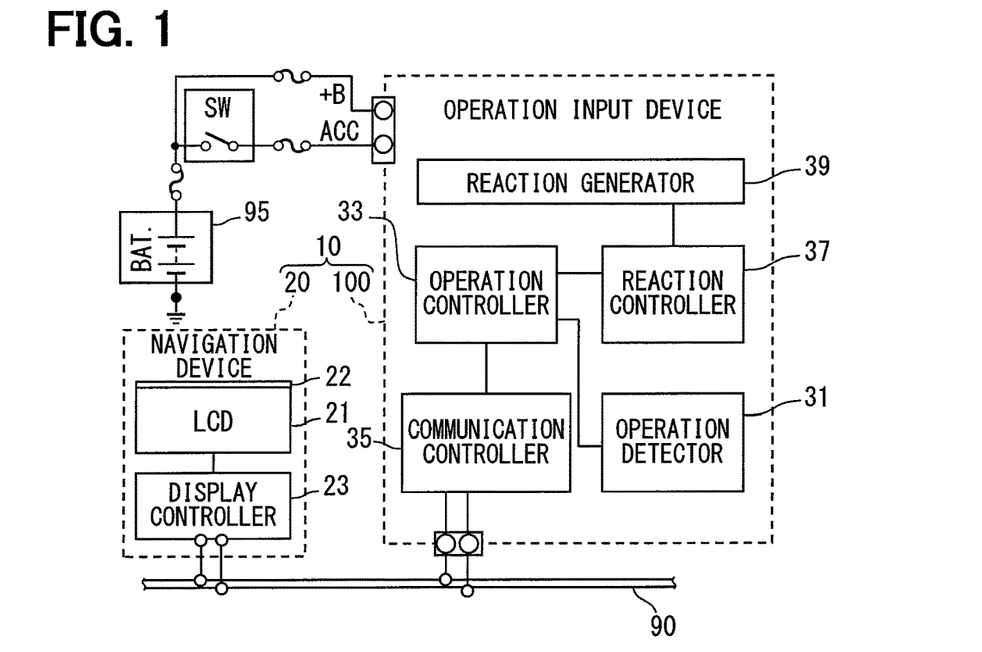
FIG. 1 is a diagram illustrating a display system including an operation input device according to a first embodiment.
Figure 2:
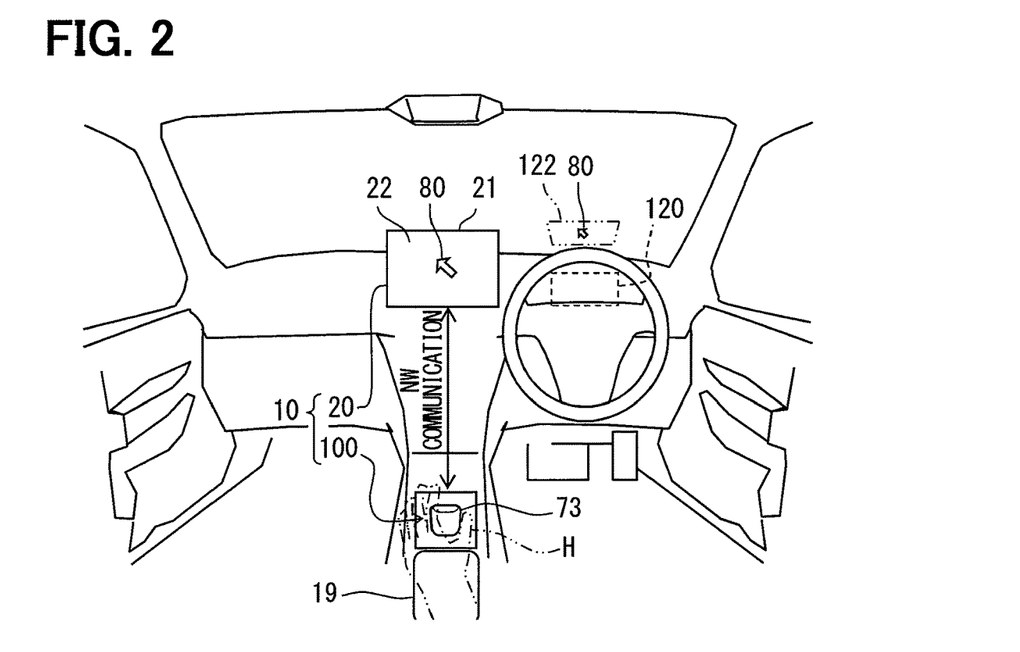
FIG. 2 is a diagram illustrating an arrangement of the operation input device in a vehicle interior.

Referring to FIG. 1, an operation input device 100 according to a first embodiment is mounted in a vehicle and configures, in a vehicle interior, a display system 10 along with other devices including, for example, a navigation device 20 or a head-up display device 120 (see FIG. 2). The operation input device 100 is, as shown in FIG. 2, installed in a center console of the vehicle adjacently to a palm rest 19 and includes an operation knob 73 exposed in an area within reach of the operator's hand. When an operating force is applied to the knob 73 by the operator's hand H, the knob 73 is displaced in the direction in which the operating force is applied.

The navigation device 20 is installed in an instrument panel of the vehicle and includes a display screen 22 exposed to face toward the driver seat. The display screen 22 displays a plurality of icons associated with predetermined functions and a pointer 80 used to select an optional icon. When a horizontal operating force is applied to the operation knob 73, the pointer 80 moves in the direction of the operating force on the display screen 22. The navigation device 20 is, as shown in FIGS. 1 and 2, coupled to a communication bus 90 and can communicate, for example, with the operation input device 100 via a network. The navigation device 20 includes a display controller 23 to draw images for display on the display screen 22 and a liquid crystal display 21 to consecutively display images drawn by the display controller 23 on the display screen 22.

Components of the operation input device 100 will be described in detail below. The operation input device 100 is, as shown in FIG. 1, coupled to the communication bus 90 and an external battery 95. The operation input device 100 can communicate, via the communication bus 90, with the navigation device 20 installed separately from the operation input device 100. From the battery 95, the operation input device 100 is supplied with power necessary to operate the components thereof.

The operation input device 100 is electrically configured with components such as a communication controller 35, an operation detector 31, a reaction force generator 39, a reaction force controller 37, an operation controller 33 etc.

The communication controller 35 outputs information processed by the operation controller 33 to the communication bus 90. Also, the communication controller 35 collects information outputted from other in-vehicle devices to the communication bus 90 and outputs the collected information to the operation controller 33.

The operation detector 31 detects the position of the operation knob 73 (see FIG. 2) moved by an operating force applied to the operation knob 73. The operation detector 31 outputs operation information representing the detected position of the operation knob 73 to the operation controller 33.

The reaction force generator 39 is configured to make the operation knob 73 generate an operation reaction force and includes an actuator, for example, a voice coil motor. The reaction force generator 39 applies, for example, when the pointer 80 (see FIG. 2) overlaps an icon on the display screen 22, an operation reaction force to the operation knob 73 (see FIG. 2) so as to cause, by means of a so-called reaction force feedback, the operator to have a pseudo-feeling of icon.

The reaction force controller 37 includes, for example, a microcomputer to perform various calculations. The reaction force controller 37 controls, based on reaction force information obtained from the operation controller 33, the direction and magnitude of the operation reaction force to be applied from the reaction force generator 39 to the operation knob 73.

The operation controller 33 includes, for example, a microcomputer to perform various calculations. The operation controller 33 obtains operation information detected by the operation detector 31 and outputs the obtained information to the communication bus 90 via the communication controller 35. The operation controller 33 also calculates the direction and magnitude of the operation reaction force to be applied to the operation knob 73 (see FIG. 2) and outputs the calculation results to the reaction force controller 37 as reaction force information.

Figure 3:
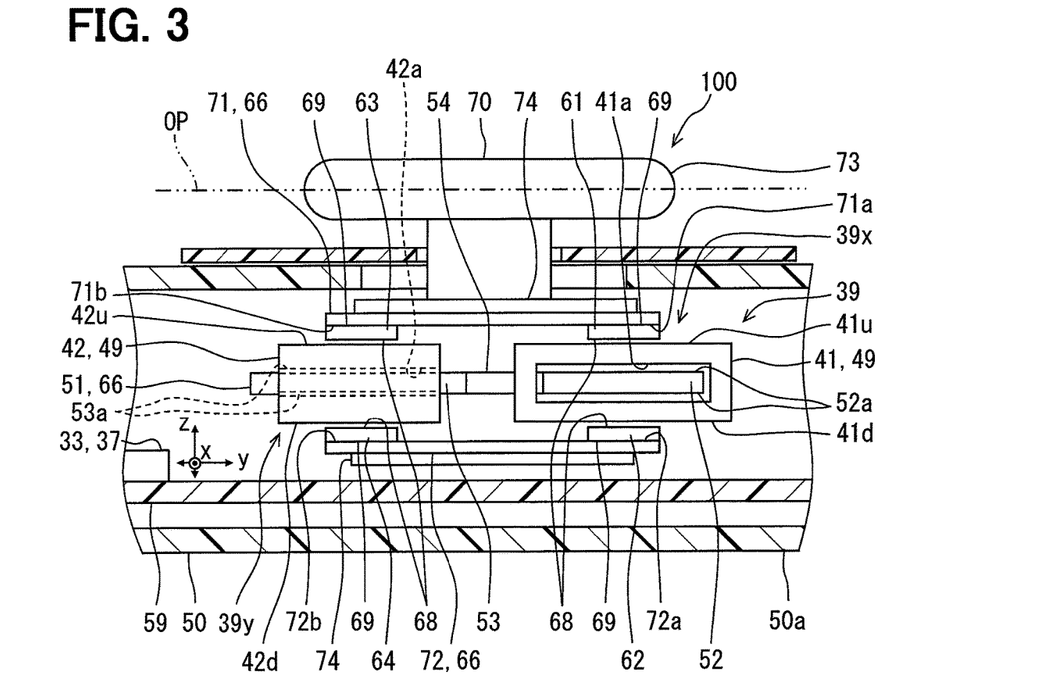
FIG. 3 is a sectional drawing illustrating a mechanical configuration of the operation input device.

The operation input device 100 has a mechanical configuration including, as shown in FIG. 3, a movable portion 70 and a fixed portion 50.

The movable portion 70 includes a knob base 74 and the operation knob 73. The knob base 74 holds a pair of movable yokes 71 and 72 being described later. The movable portion 70 is movable relative to the fixed portion 50 in the x-axis and y-axis directions along an imaginary operation plane OP. The movable range of the movable portion 70 in each of the x-axis and y-axis directions is pre-defined by the fixed portion 50. When the movable portion 70 is released from the operating force applied thereto, the movable portion 70 returns to a reference position therefor.

The fixed portion 50 includes a housing 50a and a circuit board 59 and holds a fixed yoke 51 being described later. The housing 50a accommodates components such as the circuit board 59 and the reaction force generator 39 while relatively movably supporting the movable portion 70. The circuit board 59 is fixed in the housing 50a such that the surface of the circuit board 59 extends along the operation plane OP. The circuit board 59 is mounted with, for example, a microcomputer constituting the operation controller 33 and the reaction force controller 37.

Figure 4:
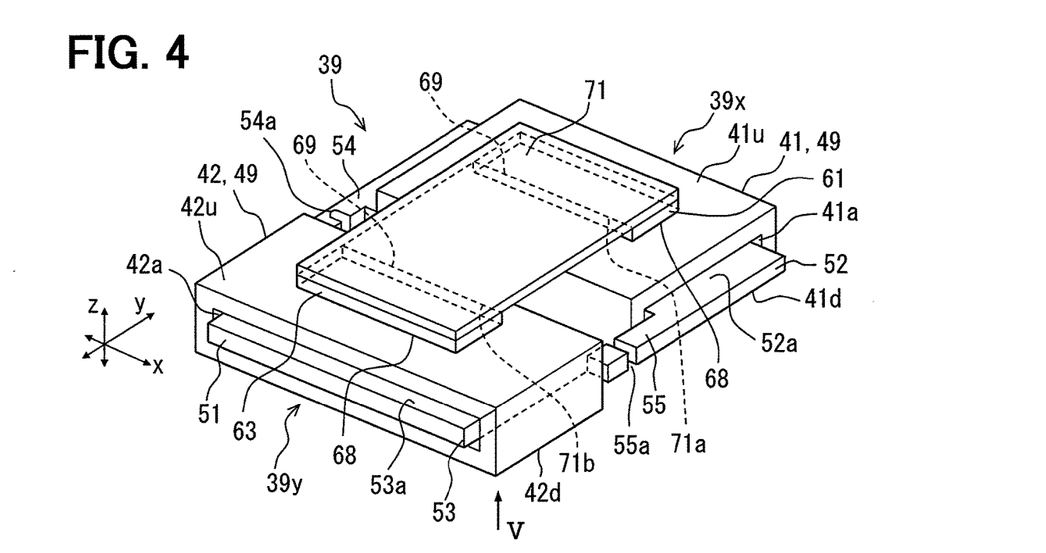
FIG. 4 is a perspective view of a reaction force generator.
Figure 5:
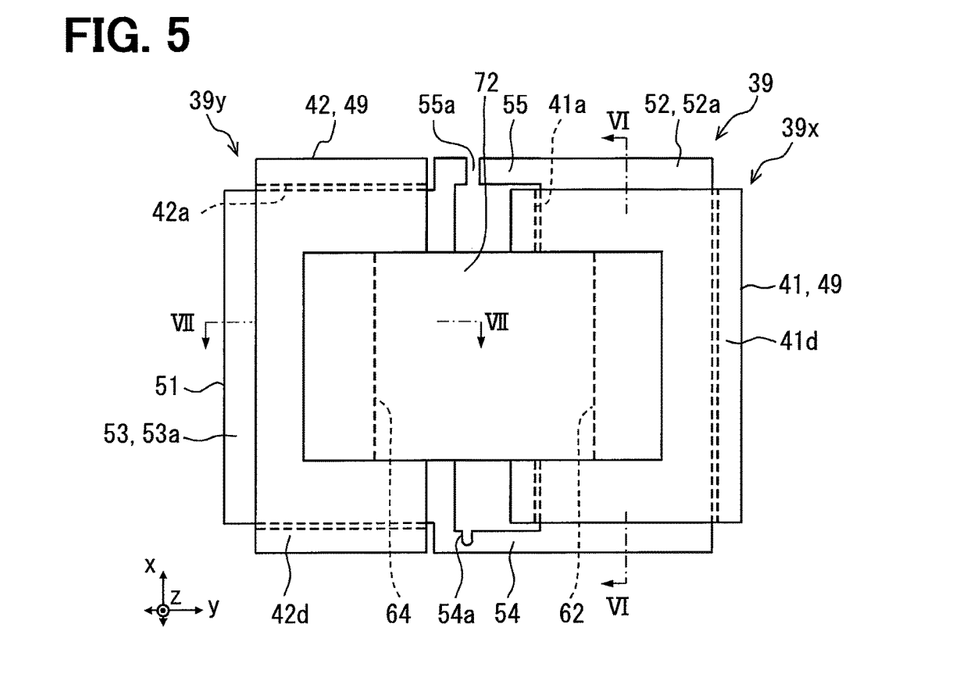
FIG. 5 is a bottom view of the reaction force generator as seen in the direction of arrow V in FIG. 4.

The reaction force generator 39 shown in FIGS. 3 to 5 carries out a reaction force feedback between the movable portion 70 and the fixed portion 50. The reaction force generator 39 includes a first voice coil motor (VCM) 39x and a second VCM 39y, a fixed yoke 51, and two movable yokes 71 and 72. Each VCM functions as an actuator. The first VCM 39x has a first coil 41 and two magnets 61 and 62. The second VCM 39y has a second coil 42 and two magnets 63 and 64. In the following, the coils 41 and 42, magnets 61 to 64, fixed yoke 51, and movable yokes 71 and 72 will be described in order in detail.

The coils 41 and 42 are each formed by winding a non-magnetic wire, for example, a copper wire into a winding 49 of a flat cylindrical shape. In each of the coils 41 and 42, the cross-section perpendicular to the winding axis direction of the winding 49 is rectangular. The winding 49 of each of the coils 41 and 42 is formed by winding a wire until the cylindrical wall of the coil is, for example, about 3 mm thick. In the coils 41 and 42, accommodation space 41a and 42a surrounded by the inner peripheries of the respective windings 49 are formed to extend in the winding axis directions of the respective windings 49. The coils 41 and 42 are electrically coupled to the reaction force controller 37 via wiring patterns formed over the circuit board 59. The windings 49 of the coils 41 and 42 are respectively applied with electric currents by the reaction force controller 37.

The coils 41 and 42 are disposed slightly apart from each other along the y axis. The coils 41 and 42 are fixed to the fixed portion 50, for example, to the circuit board 59 such that the winding axis of each winding 49 extends along the operation plane OP. In a coil (hereinafter referred to as the "first coil") 41, the winding axis extends along the x axis. In the other coil (hereinafter referred to as the "second coil") 42, the winding axis extends along the y axis. The coils 41 and 42 have a pair of coil surfaces 41u and 41d and a pair of coil surfaces 42u and 42d, respectively, all extending along the operation plane OP. The coil surfaces 41u and 42u of the coils 41 and 42 are the upperside coil surfaces of the respective coils and face the operation knob 73. The coil surfaces 41d and 42d of the coils 41 and 42 are the underside coil surfaces of the respective coils and face the circuit board 59. The coil surfaces 41u, 41d, 42u, and 42d of the coils 41 and 42 are approximately rectangular having sides extending along the x or y axis.

The magnets 61 to 64 are, for example, neodymium magnets each shaped into an approximately rectangular plate having a longitudinal direction. The two magnets 61 and 62 are disposed apart from each other in the z-axis direction substantially perpendicular to the operation plane OP and are arranged along the z-axis direction. Similarly, the other two magnets 63 and 64 are disposed apart from each other in the z-axis direction and are arranged along the z-axis direction. The magnets 61 to 64 each have a magnetized surface 68 and a mounting surface 69 both of which are smooth and flat. The magnetized surface 68 and the mounting surface 69 of each of the magnets 61 to 64 have mutually different magnetic poles (see FIGS. 6 and 7 also).

The mounting surfaces 69 of the two magnets 61 and 63 are attached to the movable yoke 71 such that their longer sides extend along the y axis. The magnetized surface 68 of the magnet 61 attached to the movable yoke 71 faces the upperside coil surface 41u of the first coil 41 across a predetermined distance in the z-axis direction. The magnetized surface 68 of the magnet 63 attached to the movable yoke 71 faces the upperside coil surface 42u of the second coil 42 across a predetermined distance in the z-axis direction.

The mounting surfaces 69 of the other two magnets 62 and 64 are attached to the movable yoke 72 such that their longer sides extend along the x axis. The magnetized surface 68 of the magnet 62 attached to the movable yoke 72 faces the underside coil surface 41d of the first coil 41 across a predetermined distance in the z-axis direction. The magnetized surface 68 of the magnet 64 attached to the movable yoke 72 faces the underside coil surface 42d of the second coil 42 across a predetermined distance in the z-axis direction. When the movable portion 70 is in its reference position, the magnetized surface 68 of each magnet is positioned to face a center portion of the corresponding one of the coil surfaces 41u, 41d, 42u, and 42d.

Figure 6:
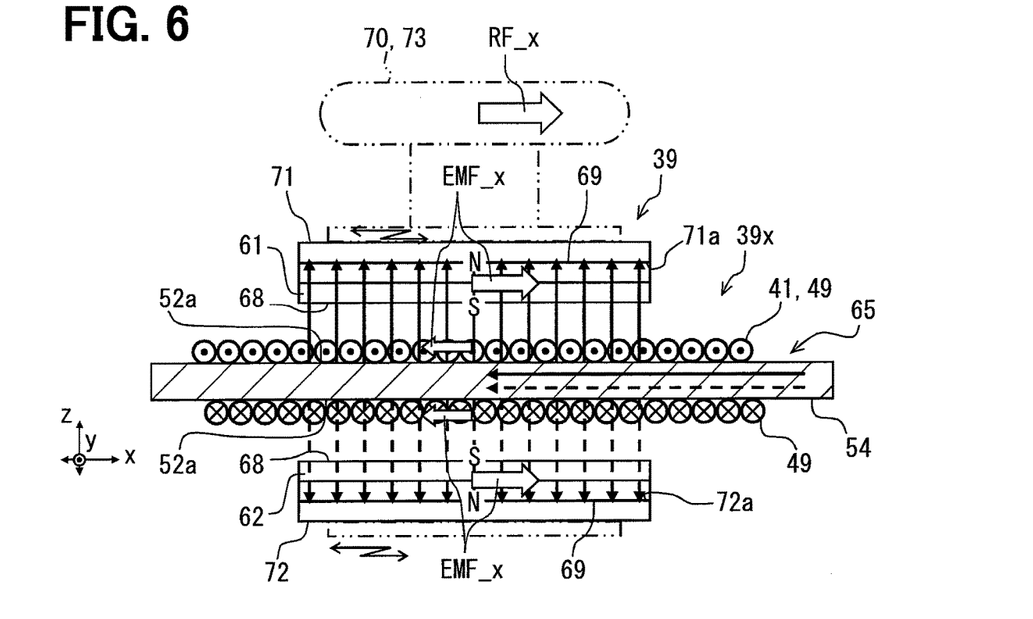
FIG. 6 is a view taken along line VI-VI in FIG. 5 schematically showing magnetic flux flows through a magnetic circuit.

In the above configuration, as shown in FIG. 6, the magnetic flux generated by each of the magnets 61 and 62 passes (penetrates) through the winding 49 of the first coil 41 in the z-axis direction. Therefore, when an electric current is applied to the first coil 41 causing electric charges to move in the winding 49 placed in a magnetic field, each electric charge generates a Lorentz force. In this way, the first VCM 39x causes electromagnetic force EMF_x in the x-axis direction (first direction) to be generated between the first coil 41 and the magnets 61 and 62. When the direction of the electric current applied to the first coil 41 is reversed, the direction of the electromagnetic force EMF_x generated is also reversed in the x-axis direction.

Figure 7:
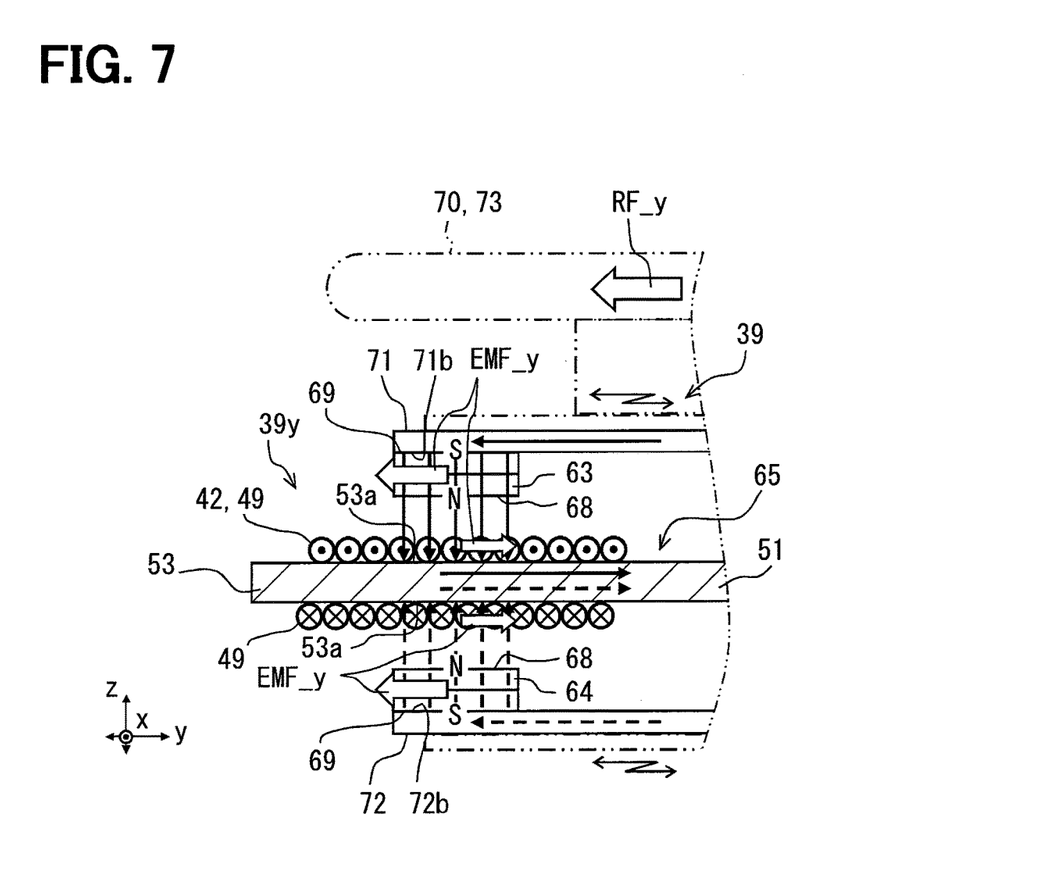
FIG. 7 is a view taken along line VII-VII in FIG. 5 schematically showing magnetic flux flows through the magnetic circuit.

As shown in FIG. 7, the magnetic flux generated by each of the magnets 63 and 64 passes (penetrates) through the winding 49 of the second coil 42 in the z-axis direction. Therefore, when an electric current is applied to the second coil 42 causing electric charges to move in the winding 49 placed in a magnetic field, each electric charge generates a Lorentz force. In this way, the second VCM 39y causes electromagnetic force EMF_y in the y-axis direction (second direction) to be generated between the second coil 42 and the magnets 63 and 64. When the direction of the electric current applied to the second coil 42 is reversed, the direction of the electromagnetic force EMF_y generated is also reversed in the y-axis direction.

The fixed yoke 51 shown in FIGS. 3 to 5 is formed of a magnetic material, for example, soft iron or a magnetic steel sheet. The fixed yoke 51 includes two coil-side yoke parts 52 and 53 and two connection parts 54 and 55. The coil-side yoke parts 52, 53 and the connection parts 54, 55 are each formed into a flat plate shape.

A coil-side yoke part (hereinafter referred to as the "first coil-side yoke part") 52 is inserted in and through the accommodation space 41a of the first coil 41. Opposite surfaces of the first coil-side yoke part 52 accommodated in the accommodation space 41a have first opposing surfaces 52a. The two first opposing surfaces 52a are positioned on the inner periphery side of the first coil 41 such that the first coil 41 is sandwiched between the two first opposing surfaces 52a on the inner periphery side of the first coil 41 and the two magnets 61 and 62 positioned on the outer periphery side of the first coil 41 and such that the two first opposing surfaces 52a face the magnetized surfaces 68 of the magnets 61 and 62, respectively.

The other coil-side yoke part (hereinafter referred to as the "second coil-side yoke part") 53 is inserted in and through the accommodation space 42a of the second coil 42. Opposite surfaces of the second coil-side yoke part 53 accommodated in the accommodation space 42a have second opposing surfaces 53a. The two second opposing surfaces 53a are positioned on the inner periphery side of the second coil 42 such that the second coil 42 is sandwiched between the two second opposing surfaces 53a on the inner periphery side of the second coil 42 and the two magnets 63 and 64 positioned on the outer periphery side of the second coil 42 and such that the two second opposing surfaces 53a face the magnetized surfaces 68 of the magnets 63 and 64, respectively. The magnetic flux generated by each of the magnets 63 and 64 and induced into the second coil-side yoke part 53 passes (penetrates) through the winding 49 of the second coil 42 in the z-axis direction.

The connection part (hereinafter referred to as the "first connection part") 54 connects an end of the first coil-side yoke part 52 in the x-axis direction to an end of the second coil-side yoke part 53 in the x-axis direction, outside of the first coil 41 and the second coil 42.

A throat part 54a is defined at the middle location of the first connection part 54 as magnetic resistance in the magnetic circuit. The throat part 54a is formed as a cutout part defined by partially cutting the first connection part 54. That is, the throat part 54a reduces the cross-section area of the first connection part 54 perpendicular to the connection direction.

The other connection part (hereinafter referred to "second connection part") 55 connects the other end of the first coil-side yoke part 52 in the x-axis direction to the other end of the second coil-side yoke part 53 in the x-axis direction, outside of the first coil 41 and the second coil 42.

An air gap 55a is formed at the middle location of the second connection part 55 as magnetic resistance in the magnetic circuit. The air gap 55a is formed so that the second connection part 55 becomes in a disconnected state with a predetermined clearance.

Thus, the fixed yoke 51 is formed to extend from the both ends and inside the accommodation chamber 41a of the first coil 41 to the both ends and inside of the accommodation chamber 42a of the second coil 42.

Each of the movable yokes 71 and 72 is, similarly to the fixed yoke 51, formed of a magnetic material, for example, soft iron or an electromagnetic steel sheet. The movable yokes 71 and 72 are each formed of a flat rectangular plate, and have shapes substantially identical to each other. The movable yokes 71 and 72 are positioned to oppose each other across the two coils 41 and 42 in the z-axis direction, and are held by the knob base 74. The movable yoke 71, 72 has a first holding surface 71a, 72a and a second holding surface 71b, 72b. The first holding surface 71a of the movable yoke 71 holds the mounting surface 69 of the magnet 61, and the second holding surface 71b of the movable yoke 71 holds the mounting surface 69 of the magnet 63. The first holding surface 72a of the other movable yoke 72 holds the mounting surface 69 of the magnet 62, and the second holding surface 72b of the other movable yoke 72 holds the mounting surface 69 of the magnet 64.

Figure 8:
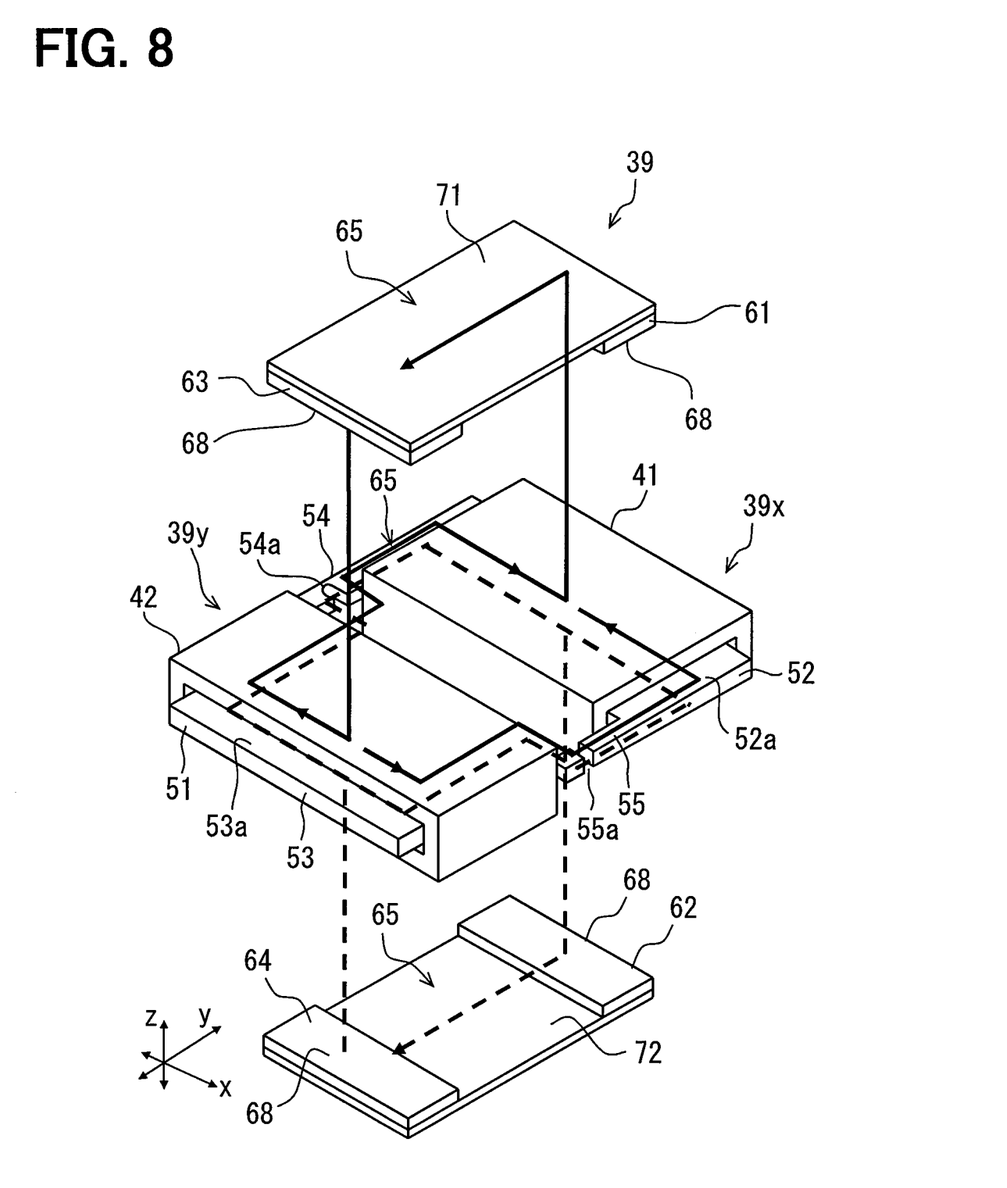
FIG. 8 is an exploded perspective view of the reaction force generator schematically showing magnetic flux flows through the magnetic circuit.

The fixed yoke 51, the two movable yokes 71 and 72 and other parts described above make up, as a magnetic path forming body 66, a magnetic circuit 65 of the reaction force generator 39 shown in FIGS. 6 to 8. The magnetic circuit 65 formed through the fixed yoke 51 and movable yokes 71 and 72 leads the magnetic fluxes generated by the magnets 61 and 62 of the first VCM 39x to the second VCM 39y while also leading the magnetic fluxes generated by the magnets 63 and 64 of the second VCM 39y to the first VCM 39x.

To be more specific, in the magnets 61 and 62 of the first VCM 39x shown in FIGS. 6 and 8, the magnetized surfaces 68 both facing the first coil 41 have a same magnetic pole. Therefore, the magnetic fluxes generated by the magnets 61 and 62 are mutually oppositely directed along the z-axis. Hence, magnetic fluxes to travel from the respective first opposing surfaces 52a toward the first holding surfaces 71a and 72a are generated. These magnetic fluxes enter the movable yokes 71 and 72 via the first holding surfaces 71a and 72a, then, in the movable yokes 71 and 72, further travel toward the second holding surfaces 71b and 72b, respectively.

Furthermore, in the magnets 63 and 64 of the second VCM 39y shown in FIGS. 7 and 8, the magnetized surfaces 68 both facing the second coil 42 have a same magnetic pole differing from the magnetic pole of the two magnetized surfaces 68 facing the first coil 41 (see FIG. 6 also). Therefore, the magnetic fluxes generated by the magnets 63 and 64 are mutually oppositely directed along the z axis. Hence, magnetic fluxes to travel from the second holding surfaces 71b and 72b toward the second opposing surfaces 53a are generated. Thus, the magnetic fluxes induced by the movable yokes 71 and 72 travel from the second opposing surfaces 53a into the second coil-side yoke part 53 and further head for the first coil-side yoke part 52 via the first connection part 54 and the second connection part 55. The magnetic fluxes induced through the fixed yoke 51 then travel from the first opposing surfaces 52a toward the first holding surfaces 71a and 72a (see FIG. 6).

As described above, in the reaction force generator 39 shown in FIGS. 6 to 8, the magnetic fluxes generated by the magnets 61 and 62 of the first VCM 39x pass through not only the first coil 41 of the VCM 39x but also the second coil 42 of the second VCM 39y by being led through the magnetic circuit 65. Similarly, the magnetic fluxes generated by the magnets 63 and 64 of the second VCM 39y pass through not only the second coil 42 but also the first coil 41 of the first VCM 39x by being led through the magnetic circuit 65. Therefore, the magnetic flux density between the first opposing surfaces 52a and the first holding surfaces 71a and 72a and the magnetic flux density between the second opposing surfaces 53a and the second holding surfaces 71b and 72b are both higher than in cases where the VCM 39x and VCM 39y include respectively different magnetic circuits. Thus, due to the increase in the density of the magnetic flux passing through the winding 49 of the first coil 41 in the z-axis direction, the electromagnetic force EMF_x that can be generated in the first VCM 39x is increased. Similarly, due to the increase in the density of the magnetic flux passing through the winding 49 of the second coil 42 in the z-axis direction, the electromagnetic force EMF_x that can be generated in the second VCM 39y is increased. In this way, it is possible, while keeping the amount of material required to form the magnets 61 to 64 small, to increase the operation reaction forces RF_x and RF_y applicable to the knob 73 in the movable portion 70 and also to the operator.

Furthermore, in the first VCM 39x of the first embodiment, the first opposing surfaces 52a are positioned to face the two magnets 61 and 62 in the z-axis direction across the winding 49 of the first coil 41 that is sandwiched between the two magnets 61 and 62 on the outer side of the winding 49 and the first opposing surfaces 52a on the inner side. Therefore, the magnetic force of the magnet 61 to attract the first opposing surface 52a facing the magnet 61 can cancel the magnetic force of the magnet 62 to attract the first opposing surface 52a facing the magnet 62. Similarly, in the second VCM 39y, the magnetic force of the magnet 63 to attract the second opposing surface 53a facing the magnet 63 can cancel the magnetic force of the magnet 64 to attract the second opposing surface 53a facing the magnet 64. When, in this way, the magnetic attraction force acting on the movable portion 70 is reduced, the movable portion 70 can be smoothly moved by the operating force applied by the operator.

Figure 9:
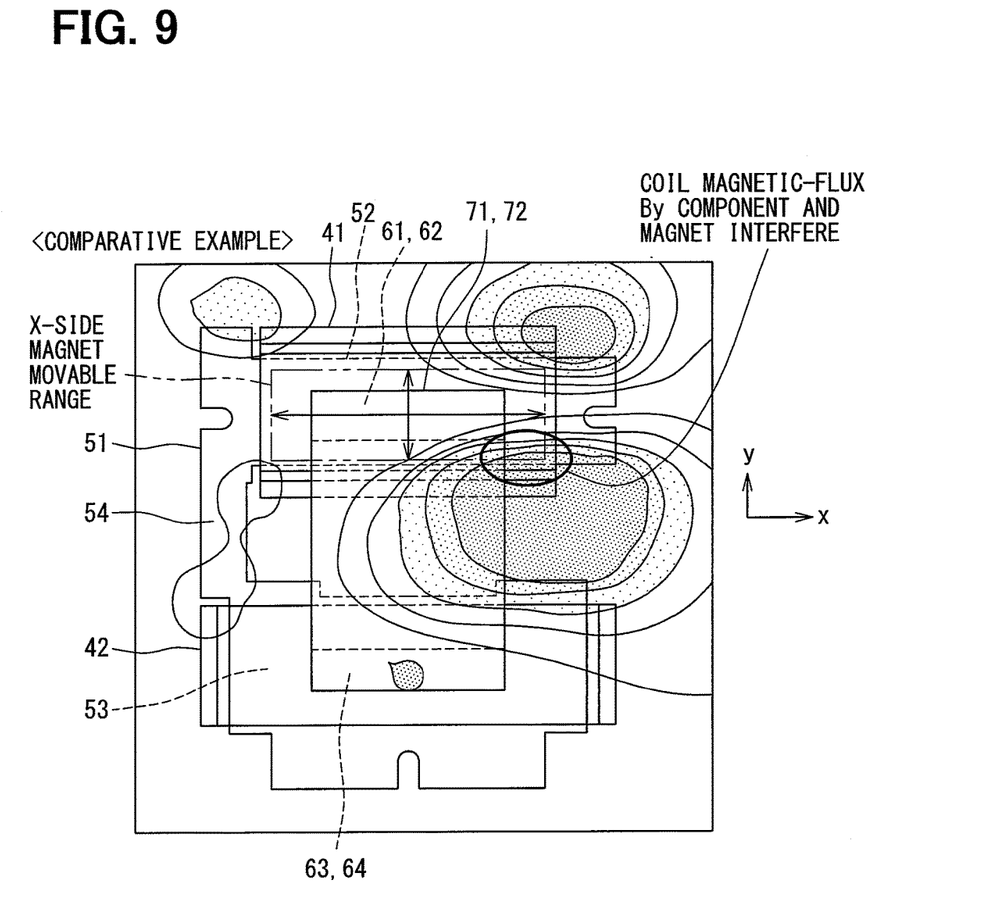
FIG. 9 is a contour map illustrating a leakage magnetic flux in a comparative example.
Figure 10:
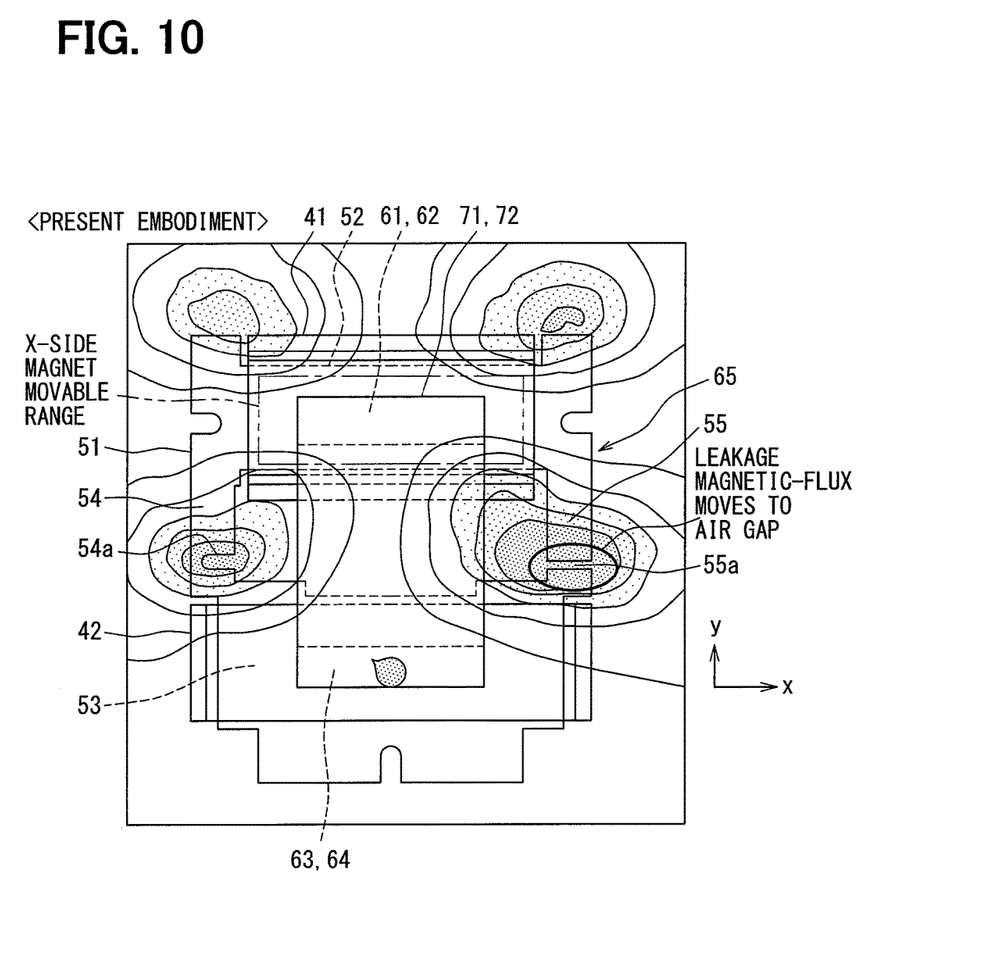
FIG. 10 is a contour map illustrating a leakage magnetic flux in the first embodiment.

FIG. 9 and FIG. 10 illustrate contour maps showing the magnetic flux in the y-axis direction (y-component of magnetic flux B) when the first coil 41 (coil of the x-axis direction) is energized, of the first coil 41 and the second coil 42. FIG. 9 shows a comparative example in which, for example, the second connection part 55 (air gap 55a) and the throat part 54a are not provided. FIG. 10 shows this embodiment.

In the comparative example shown in FIG. 9, much y-component of the magnetic flux B, i.e., much leakage magnetic flux occurs between the right-side part of the first coil-side yoke part 52 in the x-axis direction and the right-side part of the second coil-side yoke part 53 in the x-axis direction. The area in which the leakage magnetic flux is generated covers a part of the movable range of the magnets 61 and 62. Thereby, the density of magnetic flux by the magnets 61 and 62 becomes not uniform, and the generated electromagnetic force EMF_x is varied. That is, while the electromagnetic force EMF_x should be generated in the x-axis direction, electromagnetic force occurs in an unintentional direction (y-axis direction). Thus, the electromagnetic force EMF_x is not stabilized.

In contrast, according to this embodiment shown in FIG. 10, the throat part 54a is formed at the middle location of the first connection part 54, and the air gap 55a is formed at the middle location of the second connection part 55. Therefore, the area where the leakage magnetic flux is generated in the magnetic circuit 65 can be intentionally moved to the neighborhood area of the magnetic resistance (such as the air gap 55a, the throat part 54a). Because the area where the leakage magnetic flux is generated can be made distant from the magnets 61 and 62 (and the magnets 63 and 64), the influence by the leakage magnetic flux can be reduced, such that the density of magnetic flux in the magnets 61 and 62 (and the magnets 63 and 64) can be restricted from becoming not uniform. Therefore, the electromagnetic force generated in each actuator 39x (39y) can be restricted from being varied.

In the first embodiment, the operation input device 100 corresponds to an "input device". The first VCM 39x corresponds to a "first actuator", and the second VCM 39y corresponds to a "second actuator." The fixed portion 50 corresponds to a "support unit", and the movable portion 70 corresponds to an "input unit." The magnet 61, 62 corresponds to a "first magnetic pole forming unit", and the magnet 63, 64 corresponds to a "second magnetic pole forming unit." The first coil-side yoke part 52 corresponds to a "first coil side part", and the second coil-side yoke part 53 corresponds to a "second coil side part."

(Other Embodiment)

In the first embodiment, the throat part 54a is formed in the first connection part 54, and the air gap 55a is formed in the second connection part 55. However, without being limited to this, the throat part 54a may be formed in both the connection parts 54 and 55, or the air gap 55a may be formed in both the connection parts 54 and 55. Furthermore, the air gap 55a may be formed in the first connection part 54, and the throat part 54a may be formed in the second connection part 55.

In the first embodiment, the movable yoke 71 (the magnet 61, 62) and the movable yoke 72 (the magnet 63, 64) are provided to sandwich the fixed yoke 51 in the z-axis direction. However, one of the movable yokes and the respective magnets fixed to the one of the movable yokes may be omitted. In such a case, an effect of cancelling a magnetic attraction force between the opposing magnets 61 and 62 and a magnetic attraction force between the opposing magnets 63 and 64 cannot be obtained. Nevertheless, an influence of the leakage magnetic flux can be reduced such that the variation in the electromagnetic force generated in the actuator 39x (39y) is restricted as in the first embodiment.

The first embodiment may be modified in such a manner that the fixed yoke 51 is replaced with a movable yoke and all the magnets 61 through 64 are provided to the newly provided movable yoke while the opposing movable yokes 71 and 72 are replaced with fixed yokes. In such a case, a first connection part and a second connection part are defined in the newly provided movable yoke, and a magnetic resistance is provided in each of the connection parts. Thereby, effects same as the effects achieved in the first embodiment can be obtained.

The first embodiment may be modified in such a manner that the fixed yoke 51 is replaced with a movable yoke and that the opposing movable yokes 71 and 72 are replaced with fixed yokes. In such a case, a first connection part and a second connection part are defined in the newly provided movable yoke, and a magnetic resistance is provided in each of the connection parts. Thereby, effects same as the effects achieved in the first embodiment can be obtained.

The first embodiment may be modified in such a manner that the magnets 61 through 64 are stored in the accommodation chamber 41a, 42a of the coil 41, 42, respectively, and fixed to the corresponding opposing surface 52a, 53a of the fixed yoke 51. In such a case, an effect same as the effect achieved in the first embodiment can be obtained.

The first embodiment may be modified in such a manner that the display system 10 includes a head-up display device 120 (refer to FIG. 2) instead of or in addition to the navigation device 20. The head-up display device 120 is stored in the instrument panel of the vehicle in front of the driver seat and shows an image virtually by projecting the image to a projection region 122 defined within a windshield. The operator seated in the driver seat becomes able to visually confirm multiple icons correlated with preliminarily assigned functions and a pointer 80 and so on used to select a desired icon through the projection region 122. As with the pointer 80 displayed on the display screen 22, the pointer 80 can be moved across the projection region 122 in a direction corresponding to an input direction of an operation force by an input of an operation in a horizontal direction into the operation knob 73.

The first embodiment describes the operation input device set in the center console as a remote-control device to operate the navigation device or the like. It should be appreciated, however, that the input device of the present disclosure is also applicable to a selector, such as a shift lever provided to the center console, a steering switch provided to a steering wheel, and so on. The input device of the present disclosure is also applicable to an instrument panel, an arm rest provided to a door or the like, and various devices provided near back seats or the like to operate functions furnished to the vehicle. Applications of the operation input device of the present disclosure are not limited to vehicular devices and the operation input device of the present disclosure can be also adopted as a general operation system used in various transportation devices and various information terminals.

What is claimed is:

1. An input device comprising:
    an input unit for input of an operating force in a direction along an imaginary operation plane;
    a supporting unit supporting the input unit such that the input unit is movable along the operation plane in response to the input of the operating force;
    a first actuator including a first magnetic pole forming unit and a first coil, wherein the first magnetic pole forming unit forms a magnetic pole and generates a magnetic flux passing through the first coil such that an electromagnetic force generated by applying current to the first coil acts on the input unit as an operation reaction force in a first direction along the operation plane;
    a second actuator including a second magnetic pole forming unit and a second coil, wherein the second magnetic pole forming unit forms a magnetic pole and generates a magnetic flux passing through the second coil such that an electromagnetic force generated by applying current to the second coil acts on the input unit as an operation reaction force in a second direction along the operation plane and the second direction is nonparallel to the first direction; and
    a magnetic path forming body forming a magnetic circuit that guides the magnetic flux generated by the first magnetic pole forming unit to pass through the second coil and that also guides the magnetic flux generated by the second magnetic pole forming unit to pass through the first coil, wherein
    the magnetic path forming body includes
        a first coil side part corresponding to the first coil,
        a second coil side part corresponding to the second coil, and
        a first connection part that connects an end of the first coil side part to an end of the second coil side part, and a second connection part that connects the other end of the first coil side part to the other end of the second coil side part, and
    a magnetic resistance to be a resistance in the magnetic circuit is disposed at a middle location along the first connection part and the second connection part.

2. The input device according to claim 1, wherein the magnetic resistance is an air gap by which the middle location is in a disconnected state.

3. The input device according to claim 1, wherein the magnetic resistance is a throat part formed by partially cutting the middle location.

* * * * *